US011240072B2

(12) United States Patent
Ran

(10) Patent No.: US 11,240,072 B2
(45) Date of Patent: Feb. 1, 2022

(54) ADAPTATION OF A TRANSMIT EQUALIZER USING MANAGEMENT REGISTERS

(71) Applicant: Intel Corporation, Santa Clara, CA (US)

(72) Inventor: Adee Ofir Ran, Maayan Baruch (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/894,356

(22) Filed: Jun. 5, 2020

(65) Prior Publication Data

US 2020/0374159 A1 Nov. 26, 2020

Related U.S. Application Data

(63) Continuation of application No. 16/399,802, filed on Apr. 30, 2019, now Pat. No. 10,715,357.

(60) Provisional application No. 62/722,517, filed on Aug. 24, 2018.

(51) Int. Cl.
*H04L 25/03* (2006.01)
*H04L 25/49* (2006.01)
*H04B 10/25* (2013.01)

(52) U.S. Cl.
CPC .. *H04L 25/03019* (2013.01); *H04L 25/03343* (2013.01); *H04L 25/03885* (2013.01); *H04L 25/4917* (2013.01); *H04B 10/25891* (2020.05); *H04L 2025/03783* (2013.01); *H04L 2025/03808* (2013.01)

(58) Field of Classification Search
CPC ........... H04L 25/03019; H04L 25/4917; H04L 25/03885; H04L 25/03343; H04L 2025/03783; H04L 2025/038; H04L 2025/03808; H04B 10/25891
USPC ........................................................ 375/231
See application file for complete search history.

(56) References Cited

U.S. PATENT DOCUMENTS

| | | | |
|---|---|---|---|
| 9,264,267 B2 | 2/2016 | Ran | |
| 9,841,555 B2* | 12/2017 | Downie | G02B 6/02019 |
| 9,882,748 B2 | 1/2018 | Ran | |
| 9,992,125 B2 | 6/2018 | Gravel et al. | |
| 10,274,681 B1* | 4/2019 | Karimelahi | G02B 6/29352 |
| 10,728,063 B2* | 7/2020 | Wang | H04L 25/4917 |
| 2008/0175309 A1* | 7/2008 | Fimoff | H04L 25/03019 375/232 |
| 2010/0177816 A1* | 7/2010 | Malipatil | H04L 25/03057 375/233 |

(Continued)

OTHER PUBLICATIONS

Ghiasi, Ali, "C2M AUI Options", Ghiasi Quantum LLC, IEEE 802.3100GEL Task Force Adhoc Meeting, May 9, 2018, 10 pages.

(Continued)

*Primary Examiner* — Hirdepal Singh
(74) *Attorney, Agent, or Firm* — Compass IP Law PC

(57) ABSTRACT

Selection of equalization coefficients to configure a communications link between a receiver in a host system and a transmitter in an optical or electrical communication module is performed by a management entity with access to management registers in the receiver and transmitter. Continuous modification of the selected equalization coefficients is enabled on the communications link after the communications link is established to handle varying operating conditions such as temperature and humidity.

18 Claims, 17 Drawing Sheets

(56) References Cited

U.S. PATENT DOCUMENTS

| | | | |
|---|---|---|---|
| 2010/0246658 A1* | 9/2010 | Fujimori | H04B 10/291 |
| | | | 375/232 |
| 2015/0256366 A1* | 9/2015 | Ran | H04L 25/03885 |
| | | | 375/232 |
| 2016/0182257 A1 | 6/2016 | Froelich et al. | |
| 2019/0042380 A1 | 2/2019 | Sharma et al. | |
| 2019/0266122 A1* | 8/2019 | Pitigoi-Aron | G06F 13/4291 |

OTHER PUBLICATIONS

IEEE Standard for Ethernet, "Amendment 3: Media Access Control Parameters for 50 Gb/s and Physical Layers and Management Parameters for 50 Gb/s,100 Gb/s, and 200 Gb/s Operation", Sponsor LAN/MAN Standards Committee of the IEEE Computer Society,Approved Dec. 5, 2018, IEEE-SA Standards Board, New York, USA, 401 pages.

IEEE Standard for Ethernet, Section Six, Clause 78 through Clause 95 and Annex 83A through Annex 93C, IEEE Std 802.3-2018, Sponsor LAN/MAN Standards Committee of the IEEE Computer Society, IEEE-SA Standards Board, New York, USA, 708 pages.

Intel, "An 835: PAM4 Signaling Fundamentals", Mar. 12, 2019, 52 pages.

Nicholl, Gary et al., "50GbE and NG 100GbE Logic Baseline Proposal" IEEE 802.3cd Task Force, Jul. 25-28, 2016, San Diego, 27 pages.

Nicholl, Gary, Cisco Systems, "Thoughts on 100Gb/s per lane AUI Objectives", IEEE 802.3 100GEL Study Group, Jan. 2018, Geneva, 18 pages.

Stone, Rob, "100G / Lane Electrical Interfaces for Datacenter Switching—Desirable Solution Attributes", Broadcom, Geneva, Jan. 2018, 9 pages.

Sumitomo Electric, "Technical Specification for Small Form Factor Pluggable (SFP)", SCP6G28/SCP6G08-GL, Specification: TS-S08D026C, Sep. 2008, 18 pages.

* cited by examiner

| Bit 13 | Bit 12 | Description |
|---|---|---|
| 1 | 1 | Preset3 |
| 1 | 0 | Preset2 |
| 0 | 1 | Preset1 |
| 0 | 0 | Co-efficient Control |

FIG. 3B

| Bit 9 | Bit 8 | Description |
|---|---|---|
| 1 | 1 | PAM4 with precoding |
| 1 | 0 | PAM4 |
| 0 | 1 | Reserved |
| 0 | 0 | PAM2 |

FIG. 3C

| Bit 4 | Bit 3 | Bit 2 | Description |
|---|---|---|---|
| 1 | 1 | 0 | c(-2) |
| 1 | 1 | 1 | c(-1) |
| 0 | 0 | 0 | c(0) |
| 0 | 0 | 1 | c(1) |

FIG. 3D

| Bit 1 | Bit 0 | Description |
|---|---|---|
| 1 | 1 | No Equalization |
| 1 | 0 | Decrement |
| 0 | 1 | Increment |
| 0 | 0 | Hold |

FIG. 3E

| Bit 9 | Bit 8 | Description |
|---|---|---|
| 1 | 1 | PAM4 with precoding |
| 1 | 0 | PAM4 |
| 0 | 1 | Reserved |
| 0 | 0 | PAM2 |

FIG. 4B

ADAPTATION OF A TRANSMIT EQUALIZER USING MANAGEMENT REGISTERS

RELATED APPLICATIONS

This application is a continuation of U.S. patent application Ser. No. 16/399,802, filed Apr. 30, 2019. U.S. patent application Ser. No. 16/399,802 claims the benefit of U.S. Provisional Patent Application 62/722,517, filed Aug. 24, 2018. The entire specifications of which are hereby incorporated herein by reference in their entirety.

The present application is related to "TECHNOLOGIES FOR CONFIGURING TRANSMITTER EQUALIZATION IN A COMMUNICATION SYSTEM," inventor Ran, now U.S. Pat. No. 9,264,267.

TECHNICAL FIELD

Various examples described herein relate to communication networks and configuring signal characteristics.

BACKGROUND

An optical module is a hot-pluggable optical transceiver that is used in high-bandwidth data communications applications. The optical module typically has an electrical connection to a chip (for example, a host application specific integrated circuit (ASIC)). This electrical connection is a high data rate serial link (referred to as xGAUI-n where AUI stands for Attachment Unit Interface, x is the data rate per lane in Giga bits per second (Gbps), and n is the number of lanes), with current rates of 50 Gb/s per lane (50GAUI-1). 50GAUI-1 is a one lane serial link used for chip-to-chip or chip-to-module interconnections.

Serial communication between a transmitter and a receiver at very high data rates requires equalization to mitigate frequency dependent signal attenuation. Equalization can be applied at the transmitter (Tx) and/or at the receiver (Rx). Typically, a combination of transmitter and receiver equalization is used. At current rates of 50 Gb/s per lane, equalization is typically implemented in a receiver in the optical module and in a transmitter in the host.

Power consumption of an optical module is limited by thermal and power delivery requirements. Most of the power is for the optical components on the optical module. Power allocation for the electrical connection is limited to a few hundreds of milliwatts (mW) and there is a need to continue to reduce the power consumption of the optical module.

BRIEF DESCRIPTION OF THE DRAWINGS

FIG. 3B illustrates a mapping of binary bit values in the initial condition request field of a request register.

FIG. 3C illustrates an example of mapping of bit values in the modulation and precoding request field.

FIG. 3D illustrates a mapping of bit values in the coefficient select field.

FIG. 3E illustrates a mapping of bit values in the coefficient request field.

FIG. 4B illustrates a mapping of bit values in the modulation and precoding request field.

DETAILED DESCRIPTION

Figure 1:
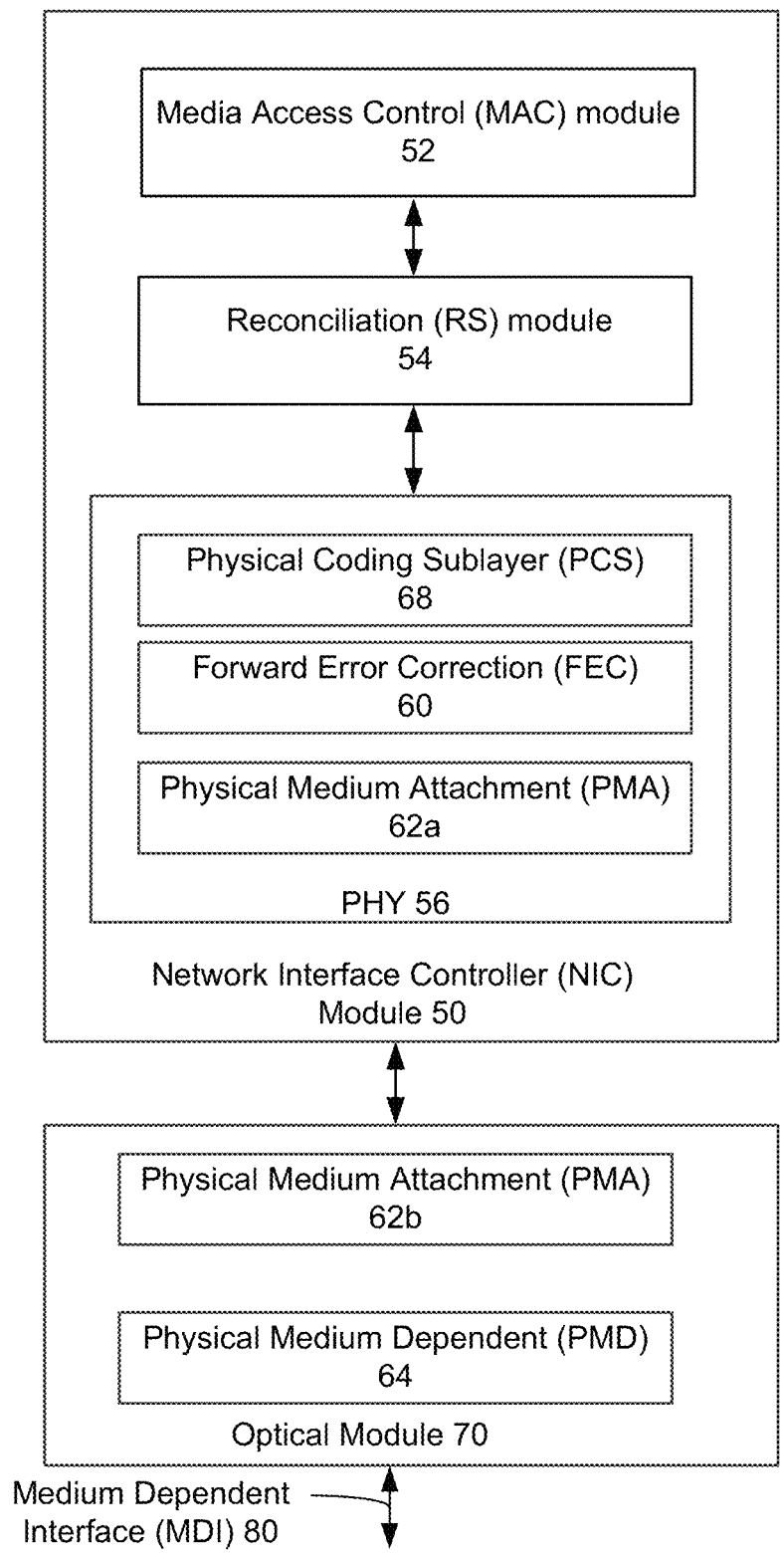
FIG. 1 is a block diagram illustrating Ethernet port logic in a network interface controller.

Previous technologies up to 50GAUI-n were separated to chip-to-module (C2M) and chip-to-chip (C2C). The C2M versions do not explicitly specify transmit equalization in the host but specify an "open eye" at the receive module with a very simple equalizer at the receive. This typically requires some transmit equalization. Transmit equalization is implementation specific and may be tuned by the host board manufacturer, based on the board characteristics, to optimize the eye opening. Fixed equalization as done in existing C2M AUIs may not work well in 100 Gb/s per lane, as the variations between modules will likely require different equalization settings, and variable operating conditions will have a higher effect on circuits and boards.

The C2C versions include specified transmit equalization using a 3-tap feed-forward equalizer (FFE) with 2 degrees of freedom whereby two taps are controllable and the third tap is set as a function of the other two. The tap settings are controlled with standardized management registers, which may be programmed to fixed settings, or optionally managed with a request-response procedure that can be performed by a management entity (accessing both receive and transmit). These registers and procedure are specified in sections 83D.3.1.1, 83D.3.3.2, and 83D.5 of the Ethernet standard (IEEE Std 802.3-2018). However, the registers specified in the C2C AUIs are limited to 3-tap FFE with a small number of setting, which is too short and too coarse for equalization of a 100 Gb/s per lane AUI. As the data rate is increased above 50 Gb/s, for example to 100 Gb/s per lane, fixed equalization as performed in a 50 Gb/s per lane chip-to-module Attachment Unit Interface may not work well in a 100 Gb/s per lane chip-to-module Attachment Unit Interface, because variations between modules may require different equalization settings.

The structure of the FFE is depicted in FIG. 83D-4 (reproduced in FIG. 5A) and its possible settings are specified in FIG. 83D-4 and Table 83D-3 of IEEE Std 802.3-2018. One example of a transmit equalization setting method in the C2C AUI is described in U.S. Pat. No. 9,264,267.

Ethernet over backplane and over copper cable assemblies use link startup protocols (specified in clause 72 of IEEE 802.3-2015 and in Clause 136 of IEEE Std 802.3cd-2018) that enable tuning transmit equalization using request and response messages. These protocols operate in-band before the link is established and do not require a common management entity to access registers on both transmit and receive sides. The request (control field) and response (status field) messages in clause 136 are described in Table 136-9 and Table 136-10 of IEEE Std 802.3cd-2018, respectively. A link startup protocol as in clause 136 requires logic on both ends to encode and decode request and response messages. This logic may not be desirable in a module implementation. Also, because this protocol operates in-band, it would not enable continuous adaptation after the link is established.

Various embodiments provide for a receiver to adjust settings of a transmitter FFE of any length and step size using requests from a receiver. In some embodiments, equalizer settings can be adjusted per-lane at least for C2C or C2M connections. Request and response registers are accessible to a management entity to enable changing one equalization coefficient at a time, with a directed change request and arbitrarily fine steps. Various embodiments provide for request and response registers accessible to a management entity, as in the C2C AUIs (as specified in 83D.5 from IEEE 802.3-2018, as well as other future standards and derivatives thereof) and C2M AUIs. Various embodiments can be used in connection with IEEE P802.3ck for 100 Gbp/s, 200 Gbp/s, 400 Gbp/s and other speeds as well as future standards and derivatives thereof.

A station management entity (STA) can monitor for messages in registers and read or write request and response message among registers when the request ID is toggled. The request ID bit can be toggled whenever a new request is generated and the management entity can read a source register to copy the content to a destination register. The management entity can access both the host application specific integrated circuit (ASIC) (e.g., MAC, PCS, FEC, or PMA) and the module during start up and/or after start-up and during operation. According to some embodiments, continuous modification of the selected equalization coefficients is enabled on the communications link after the communications link is established to handle varying operating conditions (such as temperature and humidity). However, the content of these registers is different from those of section 83D.5 and instead can be based on the message structure of the startup protocol of clause 136 of IEEE Std 802.3cd-2018, more specifically subclause 136.8.11.1.2 (Control and status fields). The message structure of the startup protocol enables changing one coefficient at a time, independent of a change to another coefficient, with a directed change request and arbitrarily fine steps.

If a receiver cannot affect transmit equalization in any way, then the receiver has to take care of equalization itself which translates to more power use by the receiver. Applying equalization at the transmitter can be done by a relatively low-power analog circuits and this could enable simple and low power C2M or C2C implementations. Various embodiments enable higher distance reach in a host-to-module 100 Gb/s per lane channel and enables lower power modules to tune the host's transmit equalizer settings, which will provide greater design freedom in hosts and modules and can provide higher data density in switch panels.

Various embodiments will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

FIG. 1 is a block diagram illustrating Ethernet port logic in a network interface controller 50. The Ethernet port logic includes a Media Access Control (MAC) module 52, a reconciliation sublayer module 54 and a PHY module 56. The PHY module 56 can include a physical medium attachment (PMA) sublayer module 62a, a forward error correction (FEC) module 60 and a physical coding sublayer (PCS) module 68.

MAC module 52 is configured to transfer data to and from the PHY module 56. The Reconciliation Sublayer (RS) module 54 can provide a mapping operation that reconciles the signals at a Media Independent Interface (MII) to the Media Access Control (MAC)-Physical Signaling Sublayer (PLS) service definitions. MAC module 52 can be configured to implement aspects of the MAC layer operations and the RS module 54 can be configured to implement reconciliation sublayer operations.

The network interface controller 50 is communicatively coupled via an xGAUI-n (a high data rate serial link) electrical connection to an optical module 70. The electrical connection may have n lanes and the data rate per lane may be 100 Gbps or greater. The optical module 70 includes Physical Layer (PHY) circuitry that includes a physical medium dependent (PMD) sublayer module 64 and a physical medium attachment (PMA) sublayer module 62b.

The Physical Medium Dependent (PMD) sublayer 64 is located just above the Medium Dependent Interface (MDI) 80 and is responsible for interfacing to the transmission medium. The Physical Medium Attachment (PMA) sublayer 62b contains functions for transmission, reception, signal detection, clock recovery and skew alignment. The PMD 64 and PMA 62b are configured to transmit and receive serial data over the MDI 80.

The FEC module 60 may decode data passed from the PMD 64 and PMA 62a, 62b to the PCS module 68 or encode data passed from the PCS module 68 to the PMD 64 and PMA 62a, 62b. The forward error correction code may improve the reliability of data transmission at higher line speeds.

In the transmit direction, the MAC module 52 receives data to be transmitted in a MAC frame over the MDI 80, and generates the MAC frame that includes inter-packet gap (IPG), preamble, start of frame delimiter (SFD), padding, and Cyclic Redundancy Check (CRC) bits in addition to the received data before passing the MAC frame to the PHY module 56 over a data bus. The PHY module 56 encodes the MAC frame as required for reliable serial transmission over the MDI 80.

In the receive direction, the MAC module 52 receives MAC frames over a data bus from the PHY module 56. The MAC module 52 accepts MAC frames from the PHY, performs Ethernet frame detection and validation, cyclic redundancy check (CRC) validation, updates statistics counters, strips out the CRC, preamble, and start of frame delimiter (SFD), and forwards the rest of the MAC frame that includes headers for other protocols to a next layer (for example, the Internet protocol (IP) layer) for processing.

In some examples, between each received Ethernet frame there are two bytes of Interframe gap and eight bytes of preamble. The eight byte preamble consists of a 56-bit (seven-byte) pattern of alternating 1 and 0 bits, providing bit-level synchronization and a start of frame delimiter (SFD) (e.g., one-byte). The SFD indicates the beginning of the Ethernet frame.

Figure 2A:
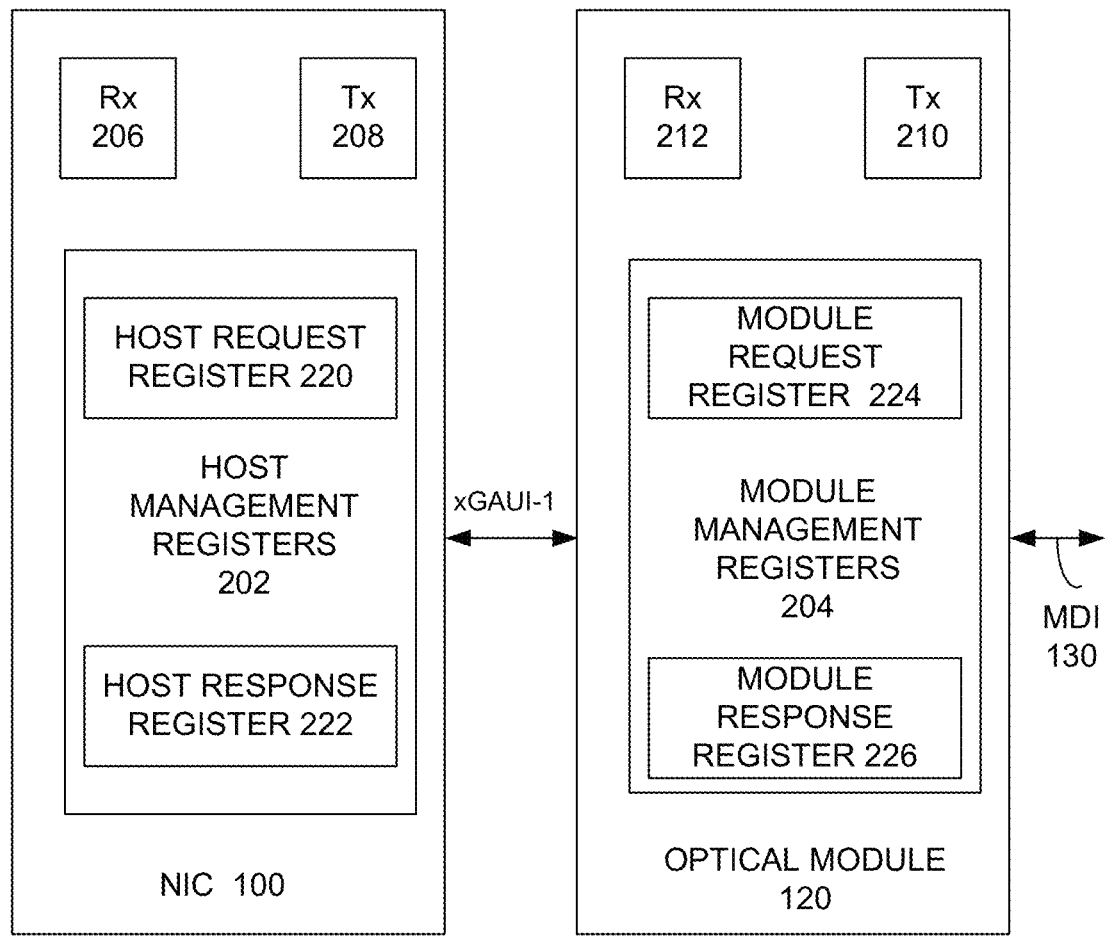
FIG. 2A illustrates a set of management registers in a network interface controller and an optical module to enable control of equalization in a transmitter.

FIG. 2A illustrates a set of management registers in a network interface controller 100 and an optical module 120 for one lane of a multi-lane Attachment Unit Interface (AUI) Chip-to-Module (C2M) to enable control of equalization in the receiver in the optical module 120 by the network interface controller 100. The multi-lane Attachment Unit Interface (AUI) Chip-to-Module forms a single link between the network interface controller 100 and an optical module 120 by transferring data in parallel over multiple lanes. In addition, the system can be used for C2C intercommunications.

Host management registers 202 in the network interface controller 100 include a host request register 220 and a host response register 222. Module management registers 224 in the optical module 120 include a module request register 224 and a module response register 224. The host management registers 202 and module management registers 224 are used at least in connection with two-way communications to perform timing recovery and equalization for a single-lane xGAUI-1 electrical link between the network interface controller 100 and the optical module 120 or other electrical interconnect module device.

The network interface controller 100 also includes a host receiver 206 and a host transmitter 208 for one lane of the xGAUI-1 electrical link between the network interface controller 100 and the optical module 120. The optical module 120 also includes a module receiver 212 and module transmitter 210 for one lane of the xGAUI-1 electrical link between the network interface controller 100 and the optical module 120.

The request registers, host request register 220 and module request register 224 will be described in conjunction with FIGS. 3A-3E. The response registers, host response register 222 and module response register 226 will be described in conjunction with FIGS. 4A and 4B.

Module request register 224 is a read-only register that can only be read by a host management entity. The host management entity may be in a device driver in an operating system, logic in a network interface controller, or logic in a media access controller. Module request register 224 may include some or all of the fields described in conjunction with request register 300 (e.g., FIG. 3A). In an embodiment, module request register 224 includes a coefficient select field and a coefficient request field and may also include a modulation and precoding request field and an initial condition request field.

The host response register 222 and/or module request register 224 may also include a one-bit receiver ready field to indicate to a host management entity that the equalization tuning is complete and that data may be reliably transmitted from the NIC 100 to the optical module 120 (or vice versa).

Figure 3A:
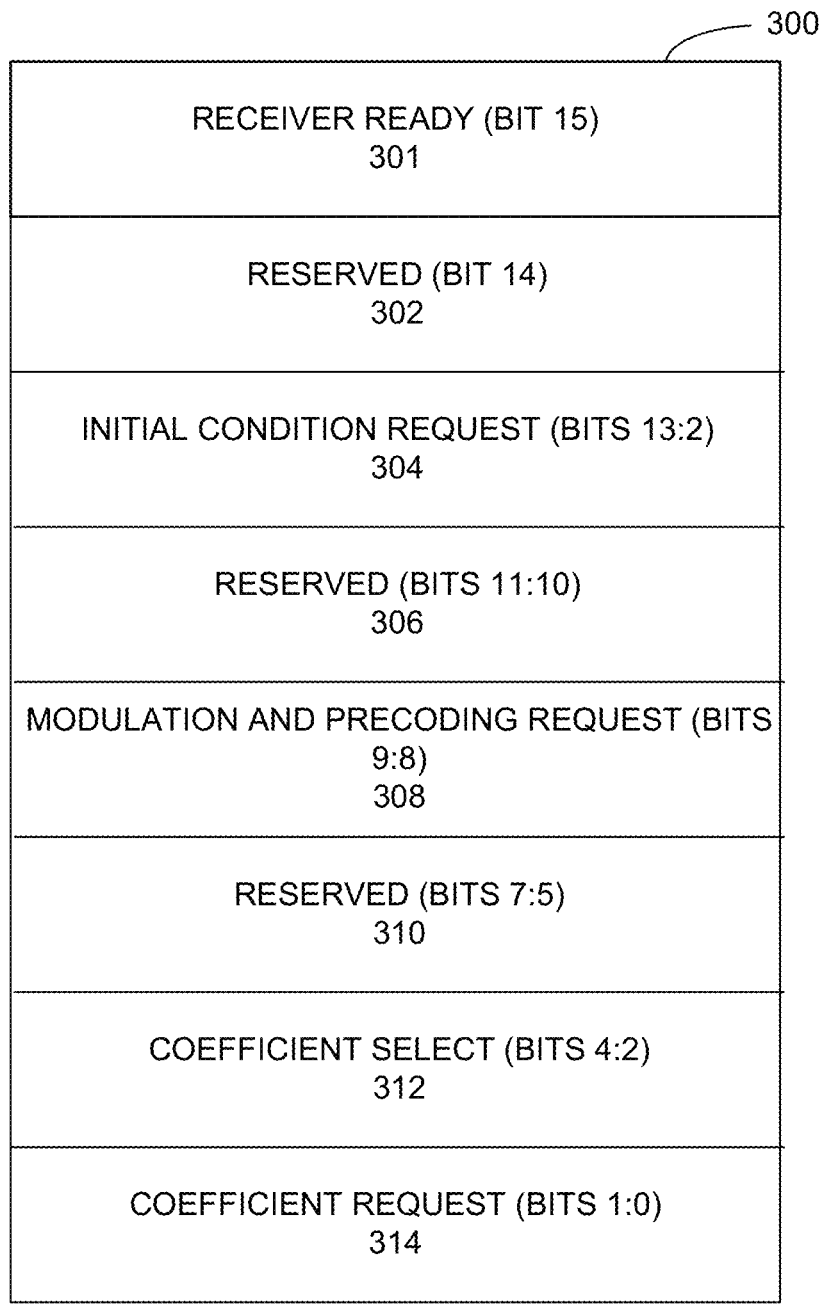
FIG. 3A depicts an embodiment of a control field structure in a request register.

The module request register 224 may also include a one-bit request identifier field which may be assigned to any of the currently reserved bits 306, 310, 302 in the request register 300 (FIG. 3A). The request identifier bit in the module request register 224 is toggled (state changed from logical 0 to logical 1 or logical 1 to logical 0) whenever a new request is generated.

The module request register 224 may also include a three-bit lane identifier field which may be assigned to any of the currently reserved bits 306, 310, 302 in the request register 300 (FIG. 3). The lane identifier field in the module request register 224 can be used to indicate the specific lane (out of several lanes) that the request applies to, in a module that has multi-lane attachment unit interface, such as a 2-lane 200 Gbps AUI (200GAUI-2). If a lane identifier is used, the host response register 222 may also include a corresponding lane identifier echo field.

The host request register 220 can be written-to by the management entity. Writing this register has the effect of conveying the request message from module request register 224 of optical module 120 to the network interface controller 100 via host request register 220, which may change the equalization setting of one or more equalizer taps as requested. A response message can be generated by writing to host response register 222.

For NIC 100 to communicate with optical module 120, module response register 226 can be written-to by the management entity to copy content of fields of host response register 222 to module response register 226. Writing to module response register 226 has the effect of conveying the response message to the optical module 120 and completing the request-response transaction. The optical module 120 may then generate further requests if needed or signal that there are no further requests using the receiver ready field in the module request register 224.

The "receiver ready" bit is set in module request register 224 when the receiver 212 in the optical module 120 does not have further requests from the transmitter 208 in the network interface controller (e.g., host) 100. The management entity may use this indication to start sending data from the network interface controller 100 to the optical module 120 for transmission to a remote station (link partner). The management entity may continue monitoring the host management registers 202 and module management registers 204 as described in conjunction with the flowgraph shown in FIG. 6A, to enable continuous or periodic adaptation of equalizer settings used to transmit signals over an operational link between the network interface controller 100 and the optical module 120.

The contents of host request register 220 are set in an implementation-dependent way, and the requests to tune the transmit equalizer so that when "receiver ready" is set to 1, the receiver 212 in the optical module 120 receiver can operate at a sufficiently low bit error ratio (BER). The contents of register host response register 222 are set by the network interface controller 100 according to whether the request is accepted or not.

The continuous or periodic equalization after the link is established may allow a greater distance between a network interface controller 100 and an optical module 102 in a host-to-module 100 Gb/s per lane channel and also reduce the power requirement for optical modules to tune the transmitter equalizer to allow more optical modules per panel in a network switch.

In an embodiment, there may be four additional registers, two module management registers in the optical module 120 and two host management registers in the network interface controller 100 to enable control of transmitter equalization in the optical module 120 by host or NIC 100. The four additional registers can have similar fields to the fields as those used in host management registers 220, 222 and module management registers 224, 226. Copying of content of registers can be made in a similar manner as that for optical module 120 to control transmitter settings of NIC 100.

Figure 2B:
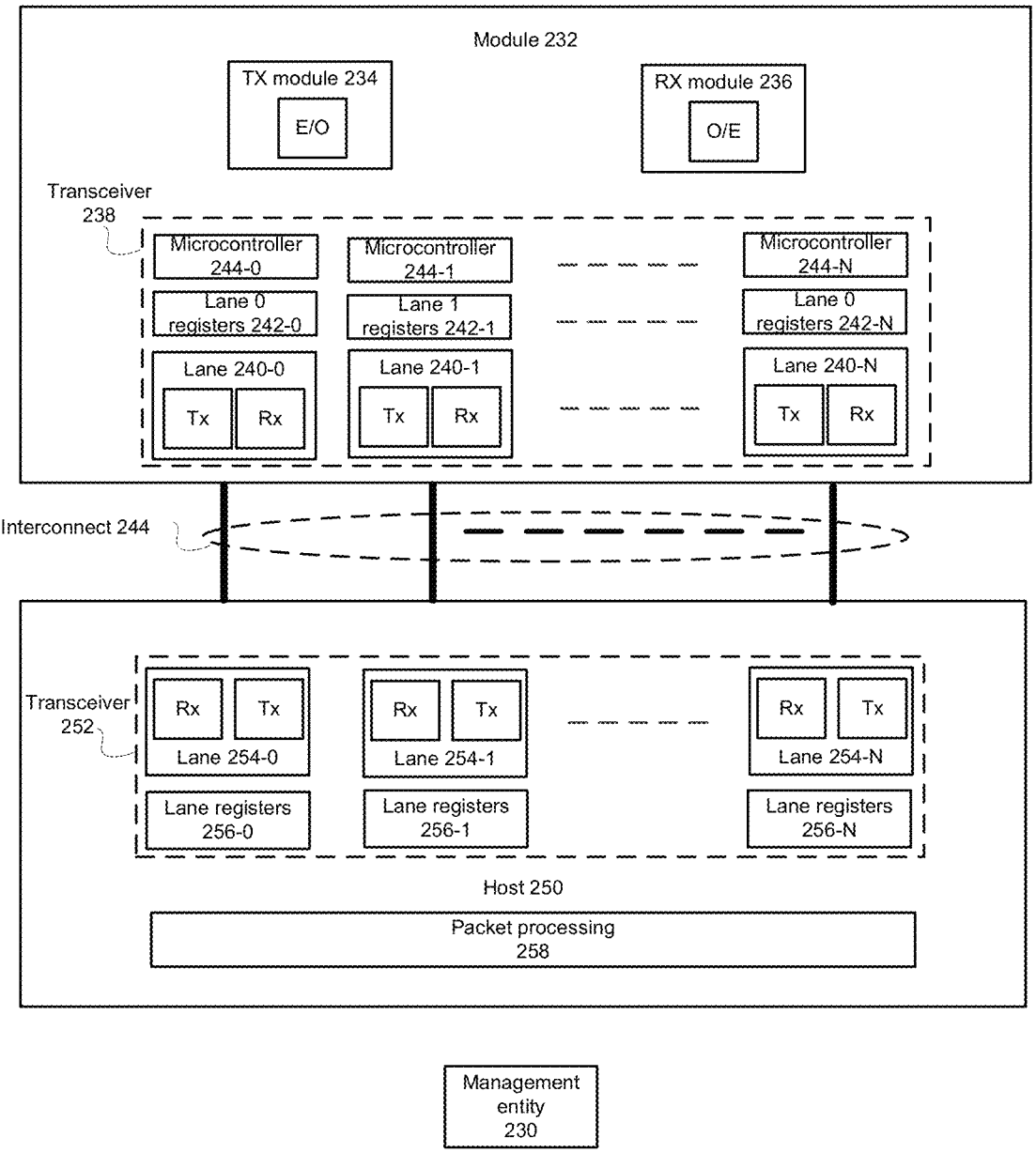
FIG. 2B depicts an example system for communicatively coupling a chip to a module.

FIG. 2B depicts an example system for communicatively coupling a chip to a module. The system can provide a chip-to-module (C2M) communications. The system can be used in a network interface, host computing platform, switch, router, interconnect, fabric, rack, server, or any computing or communications device. For example, an optical transceiver module can be connected to an interface with multiple electrical links. The system provides for multiple lanes of transmit-receive pairs that can be used to transmit or receive electrical signals between the module and the device. A lane can transmit and/or receive a signal. A transmitter of a lane can use an equalizer implemented in an analog circuit to generate an electrical signal for transmission. The equalizer can have one or more current sources that are used to create a signal whereby weights of current sources can be adjusted to change signal characteristics. Equalizer settings can be modified to change weights of current sources. For example, a digital-to-analog converter (DAC) can be used to create signal in the digital domain and output the result in an analog format.

Various embodiments use any of the message structures of the startup protocol (or PMD control function) specified in subclause 136.8.11 of IEEE Std 802.3cd-2018, but instead of passing messages over the physical medium, use a set of registers is used as a 2-way communication channel. A set of four management registers are defined for each lane of the xAUI C2C or C2M.

Module 232 can include an optical to electrical transceiver. For example, transmit (TX) module 234 can be used to convert electrical signals to optical format for transmission to an optical medium. Receive (RX) module 234 can convert optical signals received from an optical medium to electrical format.

Modules can be built using a standard mechanical and electrical form factor such as the Small Form-factor Pluggable (SFP), Quad Small Form-factor Pluggable (QSFP), Quad Small Form-factor Pluggable Double Density (QSFP-DD), Micro QSFP, or OSFP (Octal Small Format Pluggable) interfaces, described in Annex 136C of IEEE Std 802.3cd-2018 and references therein, or other form factors Transceiver 238 can be used for electrical signal transmission and receipt between module 232 and host network interface device 250. Transceiver 238 can provide multiple transmit and receive lanes for electrical signal communication between module 232 and host device 250. For example, lanes 240-0 to 240-N can provide transmit and receive circuitry for coupling with receive and transmit circuitry of lanes 254-0 to 254-N of host device 250. Lane registers 242-0 to 242-N can act as registers for lanes 240-0 to 240-N. According to some embodiments, transceiver 238 can write to any of lane registers 242-0 to 242-N to communicate with a lane partner in host 250 or communicate with management entity 230. For example, any parameter described with respect to the parameters of FIG. 3A-3E can be written in any of lane registers 242-0 to 242-N. In other examples, any parameter described with respect to the parameters of FIGS. 4A and 4B can be written in any of lane registers 242-0 to 242-N. For example, lane registers 242-0 to 242-N can represent one or multiple registers for a lane. In some examples, some lanes may share use of a register instead of a register being allocated to every lane. A register can be a region of memory, in some examples. In some examples, any address or register defined by the SFP standard or other form factor standards can be used for a register.

Module 232 can be communicatively coupled to host 250 by an interconnect 244. Interconnect 244 can be electrical signal conductors that couple pins or holes of lane 240-0 to 240-N of a pluggable module 232 to holes or pins of lanes 254-0 to 254-N of host 250. Host 250 can transmit or receive signals in electrical format to or from module 232. In some examples, module 232 provides optical communications to and from any optical medium for host 250.

Host 250 can include transceiver 252 for communication with module 232. Transceiver 252 can include lanes 254-0 to 254-N where any of lanes 254-0 to 254-N includes receive and transmit circuitry. Lane registers 256-0 to 256-N can be used for configuration or conveying operating characteristics of receive and transmit circuitry of any of lanes 254-0 to 254-N. For example, any of the parameters described with respect to FIG. 3A-3E can be written to any of lane registers 242-0 to 242-N and copied by management entity 230 to a corresponding lane register among registers 256-0 to 256-N.

Figure 4A:
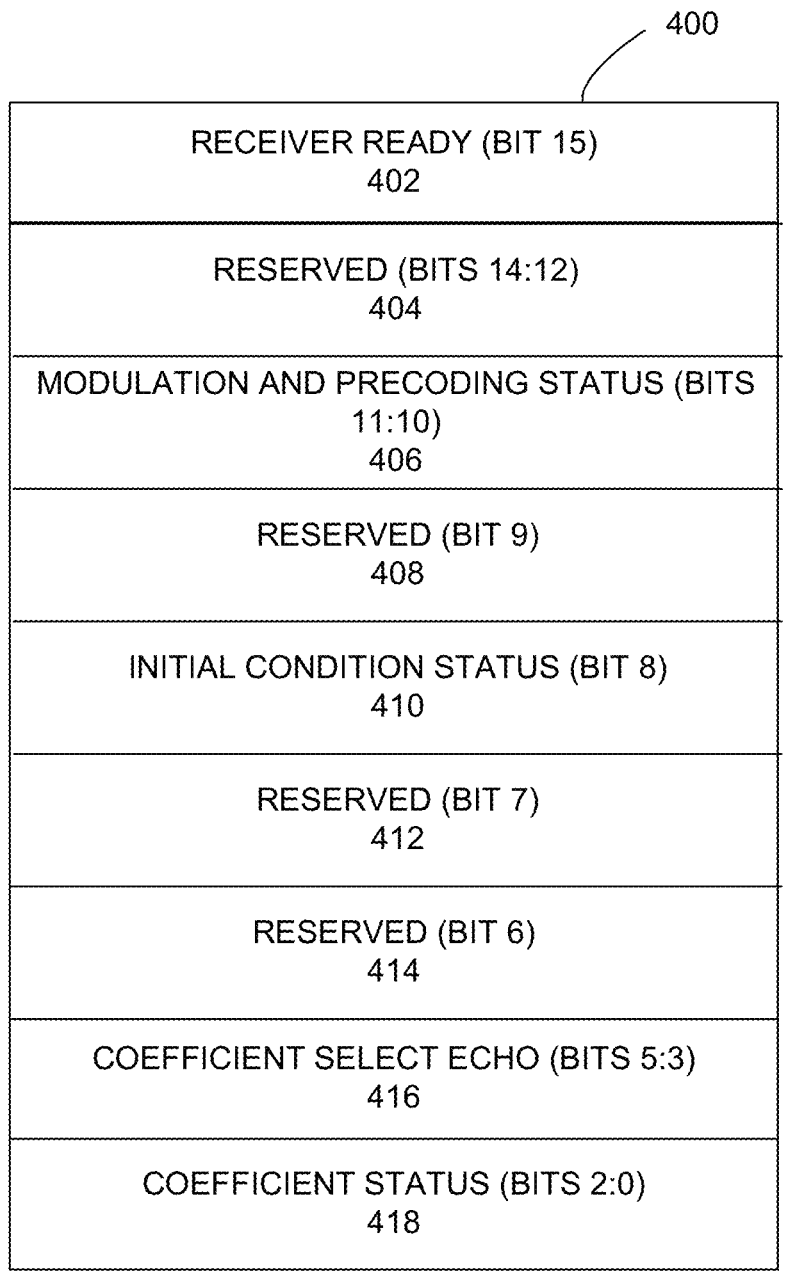
FIG. 4A depicts an embodiment of a status field structure in a response register.

In some examples, any of the parameters described with respect to FIGS. 4A and 4B can be written to any of lane registers 256-0 to 256-N and copied by management entity 230 to a corresponding lane register among registers 242-0 to 242-N. For example, lane registers 256-0 to 256-N can represent one or multiple registers for a lane. In some examples, some lanes may share use of a register instead of a register being allocated to every lane. A register can be a region of memory, in some examples. In some examples, any address or register defined by the SFP standard can be used for a register.

Management entity 230 manages operations at least of analog transmit and receive circuitry of lanes 240-0 to 240-N and lanes 254-0 to 254-N. For example, any of registers 242-0 to 242-N can be used to receive or transmit lane-specific operating commands or feedback for any of lanes 240-0 to 240-N. Likewise, any of registers 256-0 to 256-N can be used to receive or transmit lane-specific operating commands or feedback for any of lanes 254-0 to 254-N. For example, one or more of microcontrollers 244-0 to 244-N can write one or more parameters to any of lane registers 242-0 to 242-N. For example, a single microcontroller can manage equalizer settings of several lanes. The one or more parameters can cause a transmit device in any of lanes 254-0 to 254-N to adjust its equalizer setting for a specific tap, whether to increase or decrease the coefficient value of an equalizer tap. In some embodiments, the settings of a tap can be adjusted independent of adjust of settings of another tap. In response, a microcontroller associated with any of lanes 254-0 to 254-N can write a response to any of registers 256-0 to 256-N. The response can indicate that the equalizer setting was applied or not applied.

In some examples, any of a variety of interfaces can be used to communicatively couple management entity 230 to any of registers 242-0 to 242-N and any of registers 256-0 to 256-N. In some examples, a register set can be used by multiple lanes. For example, an I2C compatible interface, serial bus, Management Data Input/Output (MDIO), SMBus, Serial Peripheral Interface Bus (SPI) or other interfaces can be used.

For example, to initiate an equalizer setting change, any microcontroller 244-0 to 244-N can determine a signal quality of a received signal and determine what transmitter side tap to change and whether to increment or decrement the setting of the tap. For example, an eye opening of a received signal can be measured. An eye can represent 1 to 0 and 0 to 1 transitions of a signal and indicate whether the transitions occur within isolated time regions. A microcontroller can estimate inter-symbol interference (ISI) and select settings based on an ISI reaching a minimum value. A microcontroller can search through available transmitter tap settings and select settings that lead to a most open eye. Transmitter equalizer settings can be changed periodically starting at or after link startup and can run periodically.

Management entity 230 can monitor registers 242-0 to 242-N and registers 256-0 to 256-N for availability of new instructions or responses. A new instruction or response can be identified by a toggling of a request ID field. For example, if a microcontroller writes a new instruction to a register 242-0 to 242-N, the microcontroller toggles the value of a 1 bit request ID field. Management entity 230 reads the 1 bit request ID field and detects that the 1 bit request ID field has changed state and management entity 230 copies the one or more parameters from a register among registers 242-0 to 242-N to a partner register among registers 256-0 to 256-N. Likewise, for a response, if a microcontroller writes a new instruction to a register among registers 256-0 to 256-N, the microcontroller toggles the value of a 1 bit response ID field. Management entity 230 reads the 1 bit response ID field and detects that the 1 bit response ID field has changed state and management entity 230 copies the one or more parameters from a register among registers 256-0 to 256-N to a partner register among registers 242-0 to 242-N.

In some examples, host 250 can request to change an equalizer setting of any tap of a transmitter equalizer circuit of module 232. A request can be initiated by use of setting parameters in any of lane registers 256-0 to 256-N and management entity 230 can copy the request to a corresponding register among lane registers 242-0 to 242-N. Accordingly, module 232 and host 250 can adjust transmitter equalizer settings used by a partner device.

Packet processing 258 can perform any one or more of media access control, protocol layer processing, security, routing, destination lookup, and so forth.

Figure 2C:
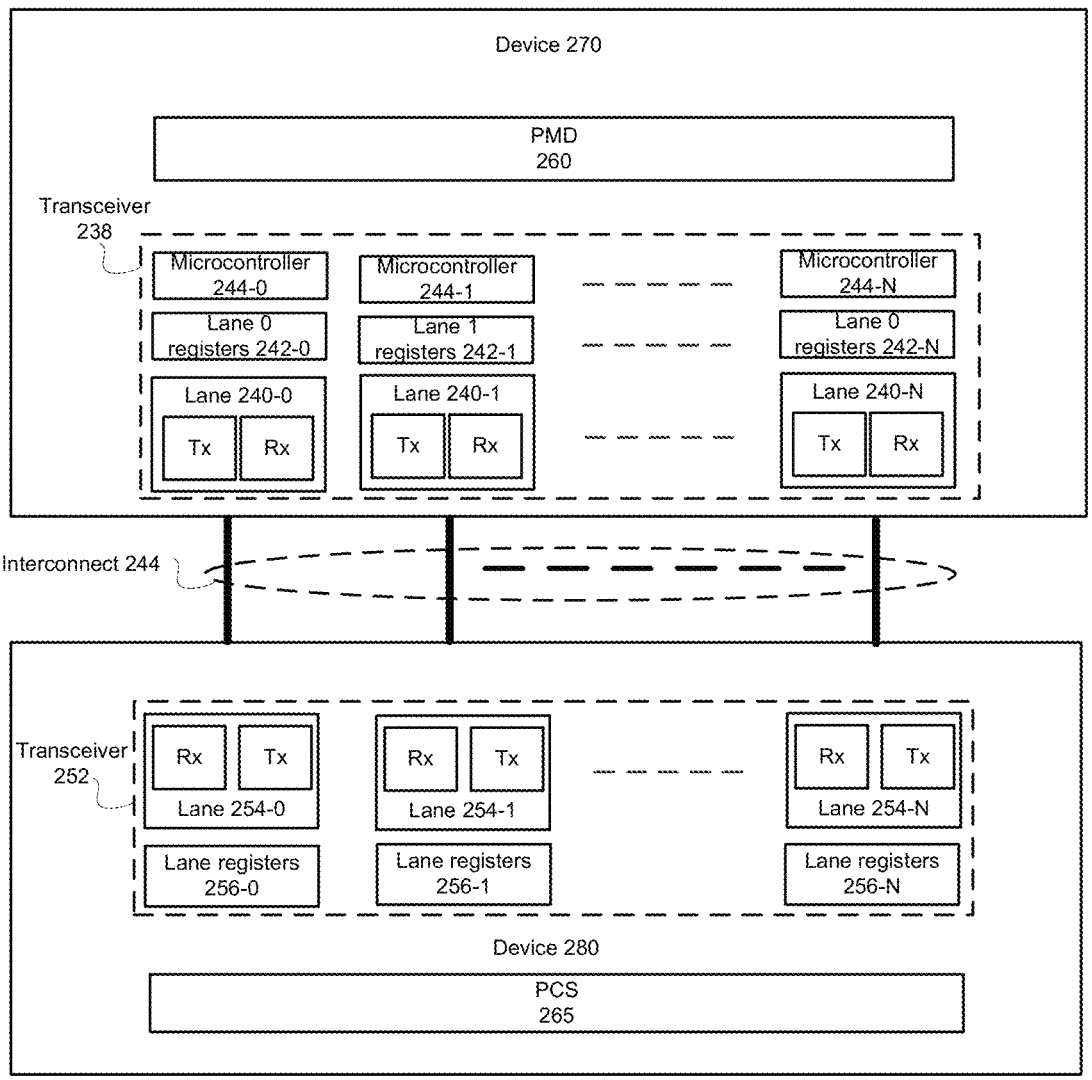
FIG. 2C depicts an example of a system that provides a chip-to-chip interface.

FIG. 2C depicts an example of a system that provides a chip-to-chip interface. For example, the system can provide a chip-to-chip (C2C) communications. Other embodiments can be used in any device to device interconnect. The system can be used in a network interface, host computing platform, switch, router, interconnect, fabric, rack, server, or any computing or communications device. In some systems, the interface can provide an interconnect between physical medium dependent (PMD) and physical coding sublayer (PCS) devices. For example, a device 270 can perform physical medium dependent sublayer related operations. Device 280 can perform physical coding sublayer related operations. Transceivers 238 and 252 can communicate in a similar manner as described with respect to FIG. 2B. Transmitter settings of either or both of transceivers 238 and 252 can be adjusted by use of registers and management entity 230.

FIG. 3A depicts an embodiment of a control field structure in a request register 300. Register 300 can be used as one of two registers in a two-way communication channel on at least one lane of an AUI Chip-to-Chip (C2C) or Chip-to-Module (C2M). Any field or parameter of the control field structure in the request register 300 may be written in host request register 220 and module request register 224 shown in FIG. 2A, host response register 222 and module response register 226 of FIG. 2A (e.g., when NIC 100 tunes a transmitter equalizer setting of optical module 120), or registers of any system of FIG. 2B or 2C. The parameters can be set to convey actions to take by a transmitter device. In some examples, a management entity can access a register that stores one or more of the parameters and copy one or more of the parameters to a destination register.

A single bit "receiver ready" field 301 can be included in bit position 15 to indicate to a management entity that the equalization tuning is complete for one or all lanes and that data may be reliably transmitted from the host to the receive module on one or more lanes.

A single bit "request ID" field can be included in part of a reserved bit to indicate to a management entity that a new request is available. The request ID bit can be toggled whenever a new request is generated. The management entity can respond by the toggling of request ID by copying a content of a register to a destination register.

A reserved bit can be used to indicate an amount to decrement or increment a coefficient.

In the embodiment shown, the request register 300 is a sixteen-bit register. There are three reserved one or two-bit fields 302, 306, 310. A two-bit initial condition request field 304 is used to select one of three predefined transmitter equalizer configurations ("presets"). If one of the presets is not selected, that is, the binary value of the initial condition request field 314 is '00', coefficient select field 312 and coefficient request field 314 are used to update the transmitter equalizer configuration.

FIG. 3B illustrates a mapping of binary bit values in the initial condition request field 304 of request register 300. Modulation and precoding request field 308 can be a two-bit field that is used to request that a link partner transmitter transmit one of three training pattern formats. The training patterns may use Pulse Amplitude Modulation (PAM) that has two distinct levels (PAM-2) to encode two bits of data or PAM-4 that has four distinct levels to encode two bits of data. Initial training uses PAM-2 which does not require a high signal quality. When quality is sufficiently high, training switches to PAM-4 which is used for data transmission after training is complete. FIG. 3C illustrates an example of mapping of bit values in the modulation and precoding request field 308.

FIG. 3D illustrates a mapping of bit values in the coefficient select field 312 for four coefficients. The coefficient select field 312 can be used to identify a coefficient that is the target of a coefficient request. The value of the coefficient select field 312 can be the two's complement encoding of a coefficient index. For example, binary value 111 can correspond to a coefficient index of −1. With a three bit coefficient select field 312, 8 coefficients may be defined to improve the accuracy of the transmitter equalization. In an embodiment the 3-bit coefficient select field 312 may be extended to 4 or more bits, to enable more than 8 coefficients to improve the accuracy of the receiver equalization.

FIG. 3E illustrates a mapping of bit values in the coefficient request field 314. The coefficient request field 314 is used to change the value of the coefficient specified by the coefficient select bits in the coefficient select field 312. A coefficient may be changed by incrementing or decrementing its value or by setting it to "No equalization". The "No equalization" value is 1 for $c(0)$ and 0 for $c(-2)$, $c(-1)$, and $c(1)$.

FIG. 4A depicts an embodiment of a status field structure in a response register 400. One of two registers can be used as a two-way communication channel on a lane of an AUI Chip-to-Chip (C2C) or Chip-to-Module (C2M). Fields or parameters of the status field structure in the response register 400 may be written in host response register 222 and module response register 226 shown in FIG. 2A or registers of any system of FIG. 2B or 2C. In some examples, a management entity can access a register that stores one or more of the parameters and copy one or more of the parameters to a destination register.

A "receiver ready" field 402 can be used to signal the local receiver state to the link partner or any entity (e.g., management entity). When this bit is logical '1', it indicates that one or more lanes in the local receiver has completed training and is prepared to receive data. When this bit is 0, it indicates that the local receiver is requesting that training continue. However, transmitter equalizer training can continue regardless of the value of the receiver ready field.

The "modulation and precoding status" field 406 is a two-bit field that encodes the value of "modulation and precoding status" bits in the status field of received training frames. The training patterns may use Pulse Amplitude Modulation (PAM) that has two distinct levels (PAM-2) to encode two bits of data or PAM-4 that has four distinct levels to encode two bits of data The "initial condition status" field 410 is a one-bit field that is set to logical '1' to acknowledge receipt of initial condition request bits.

The "coefficient select echo" field 416 is a three bit field that stores coefficient select echo bits to acknowledge the coefficient select bits received in coefficient select field 312 in the request register 300. When a change to the coefficient select bits field 312 is detected in the control field 312, the coefficient select echo bits 416 are updated to represent the same coefficient index. This serves as a confirmation to the link partner that subsequent coefficient requests will act on the targeted coefficient. In some examples, coefficient select echo field may be extended to 4 or more bits, to enable use of more than 8 coefficients.

The "coefficient status" field 418 is a three-bit field that stores coefficient status bits to acknowledge the coefficient request bits received in coefficient request field 314 in the request register 300.

A reserved field may include a single bit "response ID" field. The response ID bit can be toggled whenever a new response is generated. If a value in response ID toggles, management entity copies content of a new response to a destination register.

An embodiment of a 16-bit module request register 300 (FIG. 3A) and a 16-bit module status register 400 (FIG. 4A) have been discussed. In other embodiments, the assignments of bits to fields in module request register 300 (FIG. 3A) and module status register 400 (FIG. 4A) may be different and the format may be different, for example, the field locations may be different. In yet another embodiment, module request register 300 (FIG. 3A) and a module status register 400 (FIG. 4A) may have more or less than 16-bits. In yet another embodiment, the module request register 300 and a module status register 400 may be implemented as messages instead of registers.

FIG. 4B illustrates a mapping of bit values in the modulation and precoding request field 308.

Figure 5A:
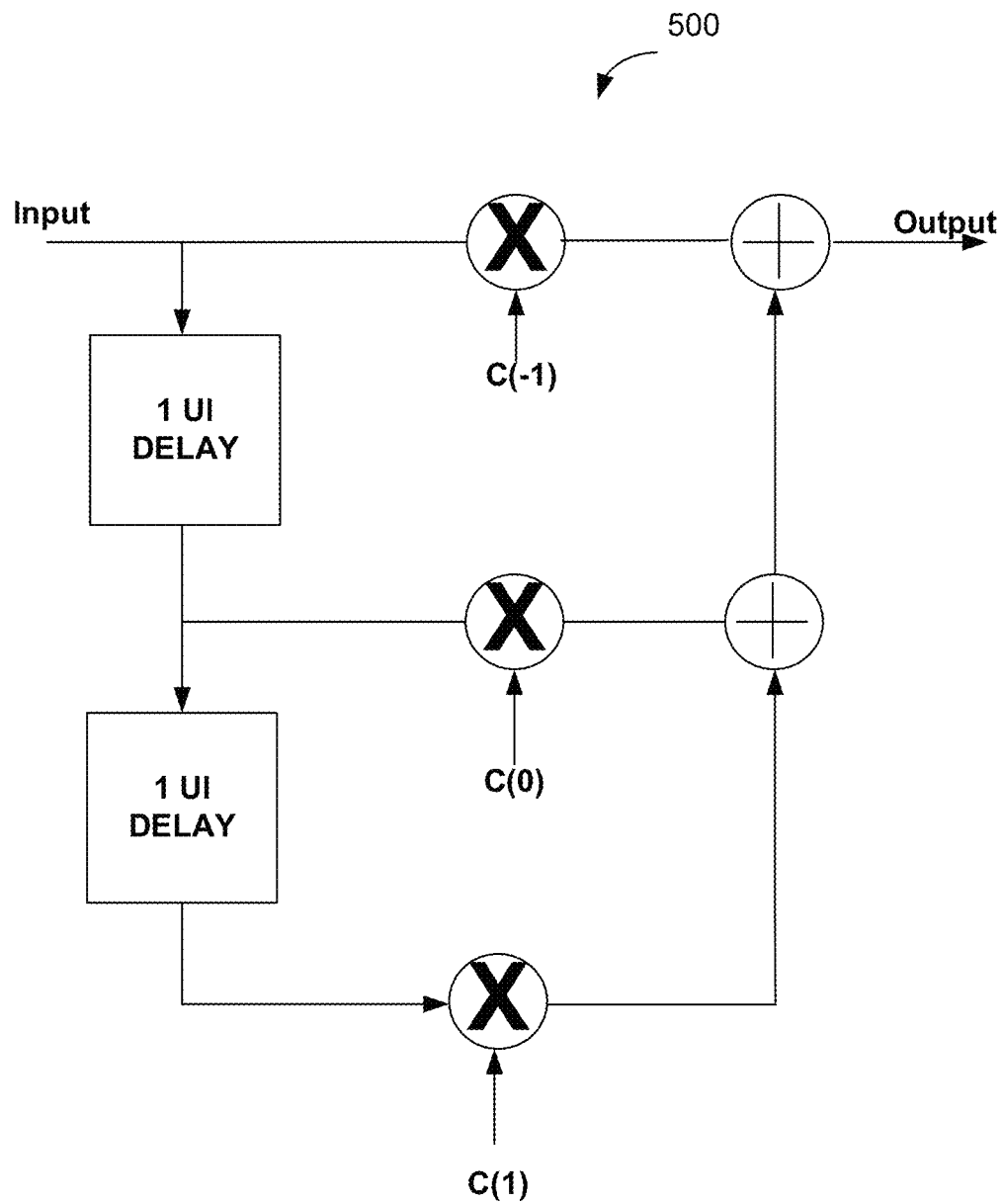
FIG. 5A depicts an example of equalizer.

FIG. 5A depicts an example of equalizer. The transmitter equalizer 500 includes a pre-cursor tap $c(-1)$, a cursor tap $c(0)$, and a post-cursor tap $c(1)$. In an illustrative embodiment, filter tap settings identifies one of four possible tap values for the pre-cursor tap $c(-1)$ using two bits and one of six possible tap values for the post-cursor tap $c(1)$. The cursor tap $c(0)$ coefficient may be calculated based on the values of the other two tap coefficients, $c(-1)$ and $c(1)$, such that the equation: $c(0)-c(1)-c(-1)=1$, is satisfied. The filter tap settings may be modified by incrementing or decrementing the filter tap settings.

Figure 5B:
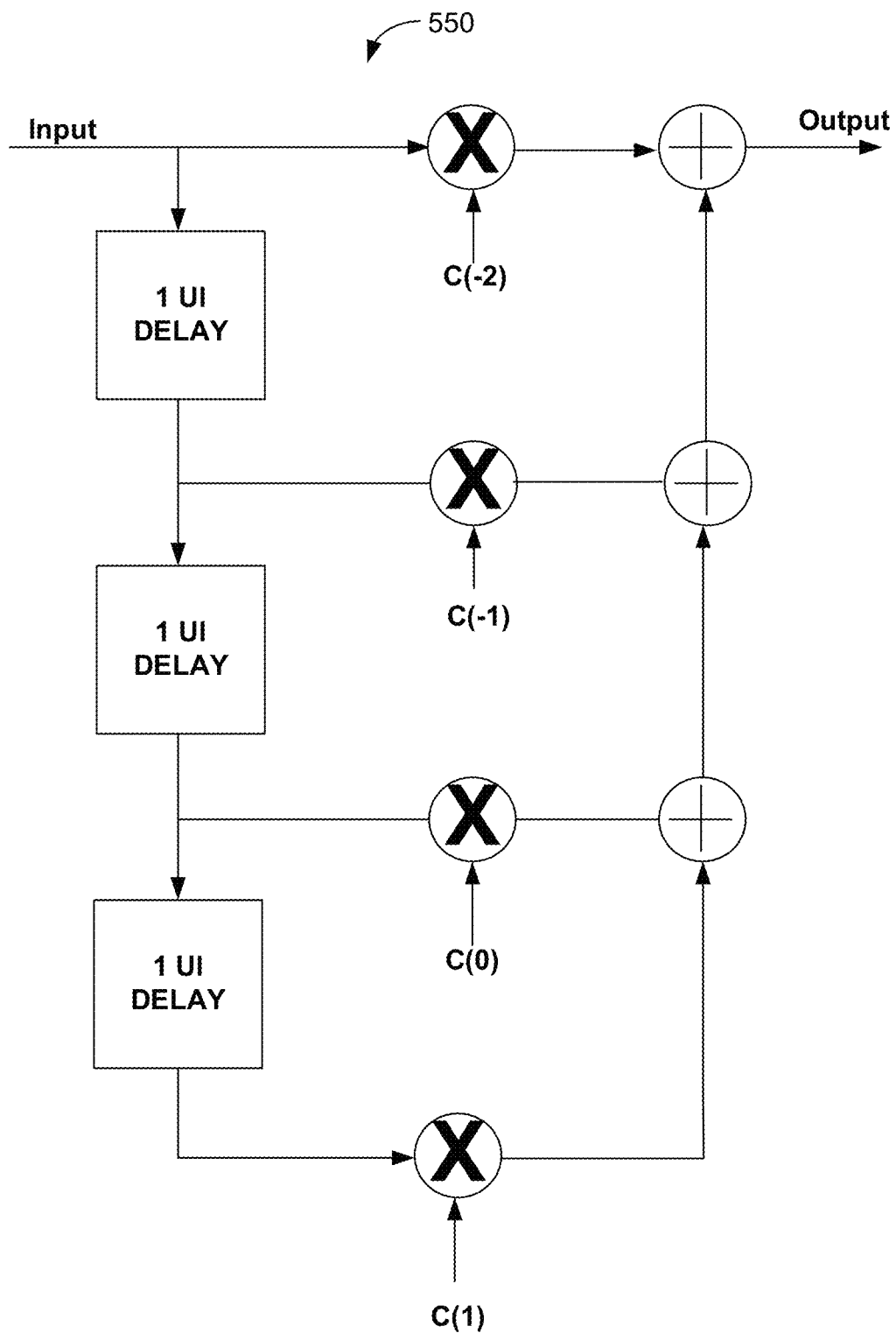
FIG. 5B depicts a functional model of a structure of a four-tap feed-forward equalizer (FFE) in a transmitter.

FIG. 5B depicts a functional model of a structure of a four-tap feed-forward equalizer (FFE) 550 in a transmitter. An FFE 550 is implemented in each communication lane interface of a chip-to-chip or chip-to-module interface. The FFE 550 includes a pre-cursor tap $c(-2)$, a pre-cursor tap $c(-1)$, a cursor tap $c(0)$, and a post-curser tap $c(1)$. The filter tap settings may be modified by incrementing or decrementing the filter tap settings. A coefficient of any tap may be modified independent of coefficient of another tap or taps.

Figure 6A:
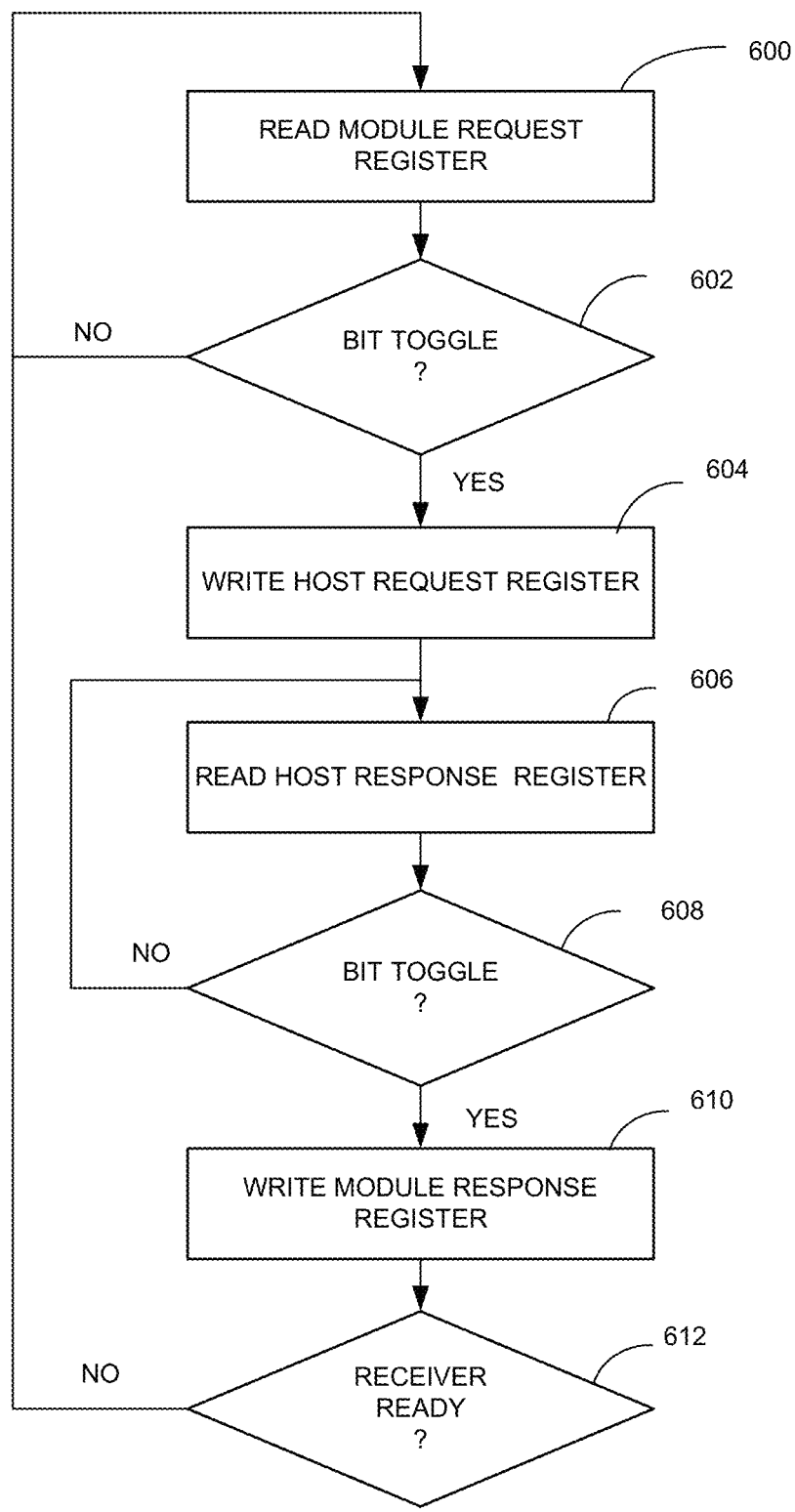
FIG. 6A is a flowgraph illustrating use of the sets of management registers to convey equalizer change commands and providing a status update.

FIG. 6A is a flowgraph illustrating use of the sets of management registers to convey equalizer change commands and providing a status update. At block 600, a management entity reads module request register. Processing continues with block 602. At block 602, if the state of a request identifier bit in module request register has toggled (that is, changed from logical 1 to logical 0 or from logical 0 to logical 1) since the last time module request register was read, processing continues with block 604. If the request identifier bit in host request register is the same as the last time host request register was read, processing continues with block 600, to read host request register again.

At block 604, the management entity writes the value read from module request register to host request register, processing continues with block 606. At block 606, the management entity reads host response register in the host management registers. Processing continues with block 608.

At block 608, if the state of a response identifier bit in the host response register has toggled (that is, changed from logical 1 to logical 0 or from logical 0 to logical 1), processing continues with block 610. If the response identifier bit in host response register is the same as the last time host response register was read, processing continues with block 606, to read host response register again.

At block 610, the value read from host response register is written to module response register, processing continues with block 612. At block 612, if the receive ready bit is set (logical '1') in the module request register, the module receiver equalization process is complete. In an embodiment, the module receiver equalization process concludes an iteration when the "receiver ready" bit in module request register is set to 1, but the module receiver equalization process can run continuously or periodically on any or all lanes despite the value of "receiver ready."

The communications link may include a plurality of lanes as discussed earlier. In some embodiments, the "receiver ready" bit set to '1' may indicate that one of the lanes is ready and processing continues with block 600 to perform the module receiver equalization process for another lane (e.g., next lane). In another embodiment, if the lane identifier is included in the response and receive registers, the "receiver ready" bit set to '1' may indicate that all lanes in the communication link are ready.

The management entity may use the indication of "receiver ready" bit set to '1' to permit transmission of real data (as opposed to training data) from the host transmitter to the module for transmission to a remote station (link partner). If the indication of "receiver ready" bit is not set to '1', return to block 600 and the receiver can continue to tune any transmitter equalizer settings for the same lane. For example, the "receiver ready" bit can be set to '1' if a sufficiently low bit error rate (BER) is detected by the receiver.

Figure 6B:
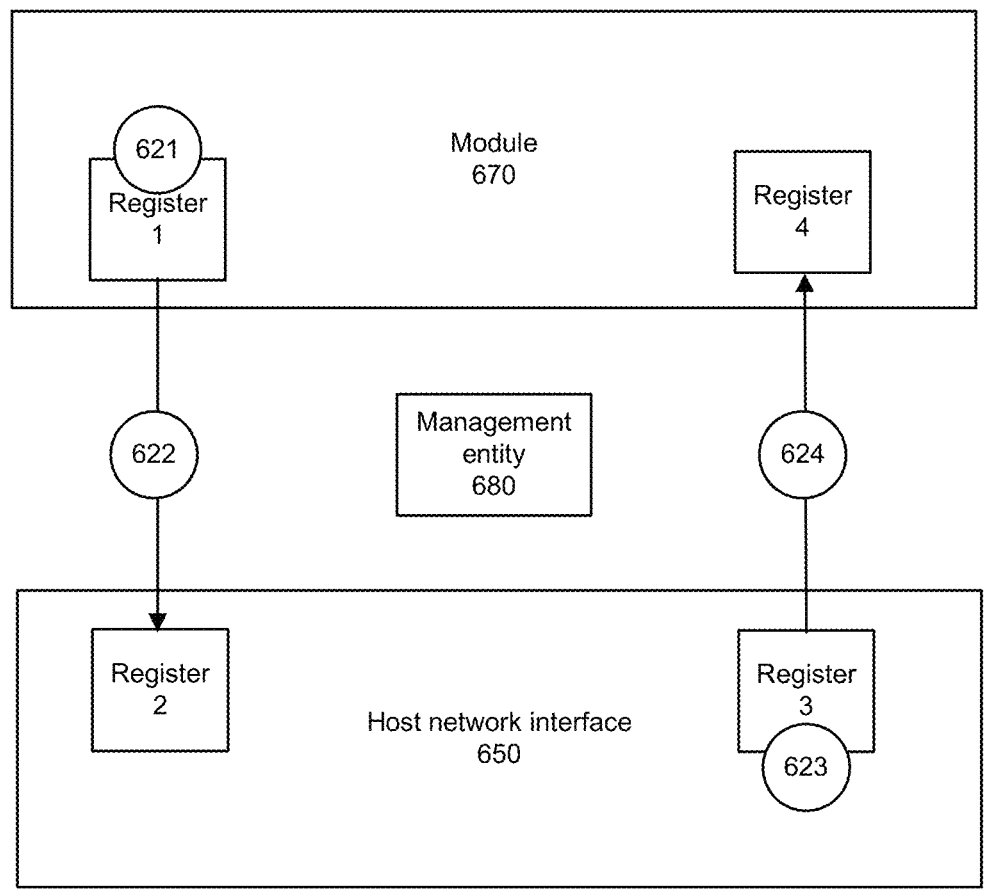
FIG. 6B depicts an example of a sequence of events that can take place in order for a device with a receiver to attempt to modify transmit equalizer settings of a transmitter in one or more lanes.

FIG. 6B depicts an example of a sequence of events that can take place in order for a device with a receiver to attempt to modify transmit equalizer settings of a transmitter in one or more lanes. At 621, module 670 changes transmit equalization of transmit partner. The module 670 writes the transmit equalization change request to register 1 and toggles the request ID field to indicate new change request is made. The fields in register 1 can include "coefficient select" to select a coefficient to change and "coefficient request" to select extent of change in coefficient (increment or decrement). At 622, management entity 680 can detect that the request ID field is toggled and copies information in register 1 to register 2 of host network interface 650.

Register 2 located at host network interface 650 can be a writeable register that receives a copy of fields in register 1. Writing to register 2 has the effect of conveying the request message to the host network interface 650. The request message can select a transmitter equalizer tap setting to adjust. At 623, host network interface 650 can respond by generating a response message in register 3. Register 3 can be a read-only register that includes a response message. The fields in register can include at least "coefficient select echo" (indicates selected coefficients that were requested to be updated) and "coefficient status" (updated, not updated, etc.). A response ID bit can be toggled whenever a new response is generated so that the management entity knows when a new response is to be copied to register 4. At 624, in response to detecting a toggling of a response ID in register 4, management entity copies content of register 3 to register 4. Register 4 can be a writeable register that includes a copy of content of register 3. Writing to register 3 conveys the response message to module 670 and signals that the transaction is complete. The receiver module may then generate another request based on its schedule by writing to register 1 and toggling "request ID" field. After an iteration of a transmitter equalizer setting is complete, Register 1 may be modified to include a "receiver ready" bit to indicate to a management entity (or other software and/or hardware) that the equalization tuning is complete and that data may be transmitted from the host to the receive module.

A similar set of registers (e.g., registers 5 through 8) may be added to enable control of module 670's transmitter equalization by host 650 so that module 670 will have specified tunable transmit equalization for transmission of data from module 670 to host 650. In some cases, the same registers 1-4 can be used by host 650 to tune transmitter equalizer settings of module 670.

Figure 7:
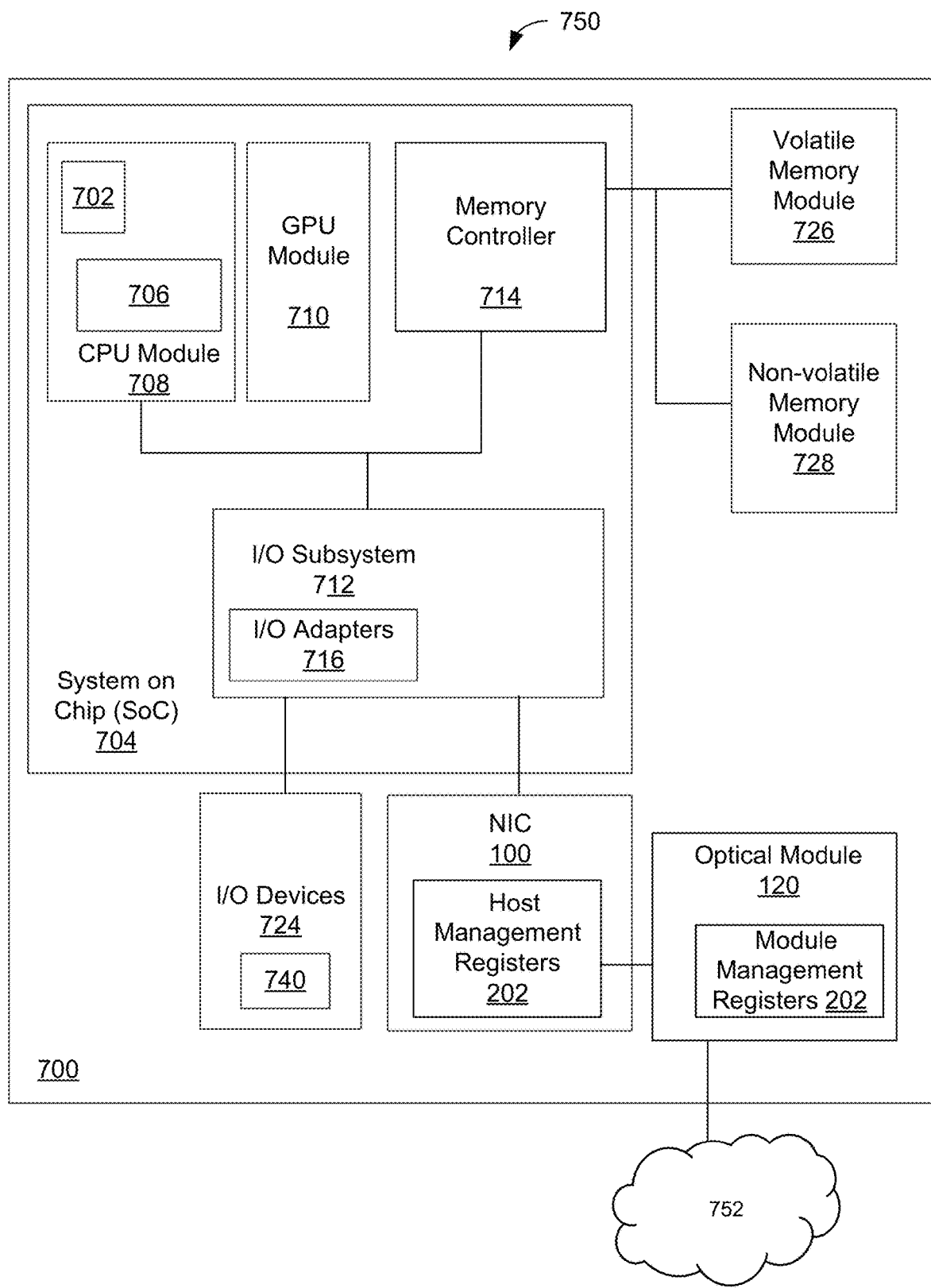
FIG. 7 is a block diagram of a system that can communicate equalization settings between a transmitter and receiver.

FIG. 7 is a block diagram of a system that includes management registers 202, 204 to communicate equalization settings between a transmitter in an optical module 120 and receiver in a network interface controller 100. System 700 includes a system on chip (SOC or SoC) 704 which combines processor, graphics, memory, and Input/Output (I/O) control logic into one SoC package. The I/O adapters 716 may include a Peripheral Component Interconnect Express (PCIe) adapter that is communicatively coupled over bus 744 to a network interface controller 100.

Selection of equalization coefficients to configure a communications link between the network interface controller 100 and the optical module 120 may be performed by a management entity with access to host management registers 202 and module management registers 204. Continuous modification of the selected equalization coefficients is enabled on the communications link after the communications link is established.

The SoC 704 includes at least one Central Processing Unit (CPU) module 708, a memory controller 714, and a Graphics Processor Unit (GPU) module 710. In other embodiments, the memory controller 714 may be external to the SoC 704. The CPU module 708 includes at least one processor core 702 and a level 2 (L2) cache 706.

Although not shown, the processor core 702 may internally include one or more instruction/data caches (L1 cache), execution units, prefetch buffers, instruction queues, branch address calculation units, instruction decoders, floating point units, retirement units, etc. The CPU module 708 may correspond to a single core or a multi-core general purpose processor, such as those provided by Intel® Corporation, according to one embodiment. In an embodiment the SoC 704 may be an Intel® Xeon® Scalable Processor (SP) or an Intel® Xeon® data center (D) SoC.

A non-volatile memory (NVM) device 728 is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

Volatile memory 726 is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WI02 (Wide Input/Output version 2, JESD229-2 originally published by JEDEC in August 2014, HBM (High Bandwidth Memory, JESD325, originally published by JEDEC in October 2013, DDR5 (DDR version 5, currently in discussion by JEDEC), LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

The Graphics Processor Unit (GPU) module 710 may include one or more GPU cores and a GPU cache which may store graphics related data for the GPU core. The GPU core may internally include one or more execution units and one or more instruction and data caches. Additionally, the Graphics Processor Unit (GPU) module 710 may contain other graphics logic units that are not shown, such as one or more vertex processing units, rasterization units, media processing units, and codecs.

Within the I/O subsystem 712, one or more I/O adapter(s) 716 are present to translate a host communication protocol utilized within the processor core(s) 702 to a protocol compatible with particular I/O devices. Some of the protocols that I/O adapter(s) 716 may be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1394 "Firewire".

The I/O adapter(s) 716 may communicate with external I/O devices 724 which may include, for example, user interface device(s) including a display and/or a touch-screen display 740, printer, keypad, keyboard, communication logic, wired and/or wireless, storage device(s) including hard disk drives ("HDD"), solid-state drives ("SSD") 718, removable storage media, Digital Video Disk (DVD) drive, Compact Disk (CD) drive, Redundant Array of Independent Disks (RAID), tape drive or other storage device. The storage devices may be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (NVM Express) over PCIe (Peripheral Component Interconnect Express), and SATA (Serial ATA (Advanced Technology Attachment)).

Additionally, there may be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

It is envisioned that aspects of the embodiments herein may be implemented in various types of computing and networking equipment, such as switches, routers, racks, and blade servers such as those employed in a data center and/or server farm environment. Typically, the servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers.

Each blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board. These components may include the components discussed earlier in conjunction with FIG. 7.

For example, equalization coefficients selected for a communications link between blades or other devices may need to be modified after the communications link is established to handle variations in operating conditions, for example, temperature and humidity that may cause an increase in bit errors over the communications link.

Figure 8:
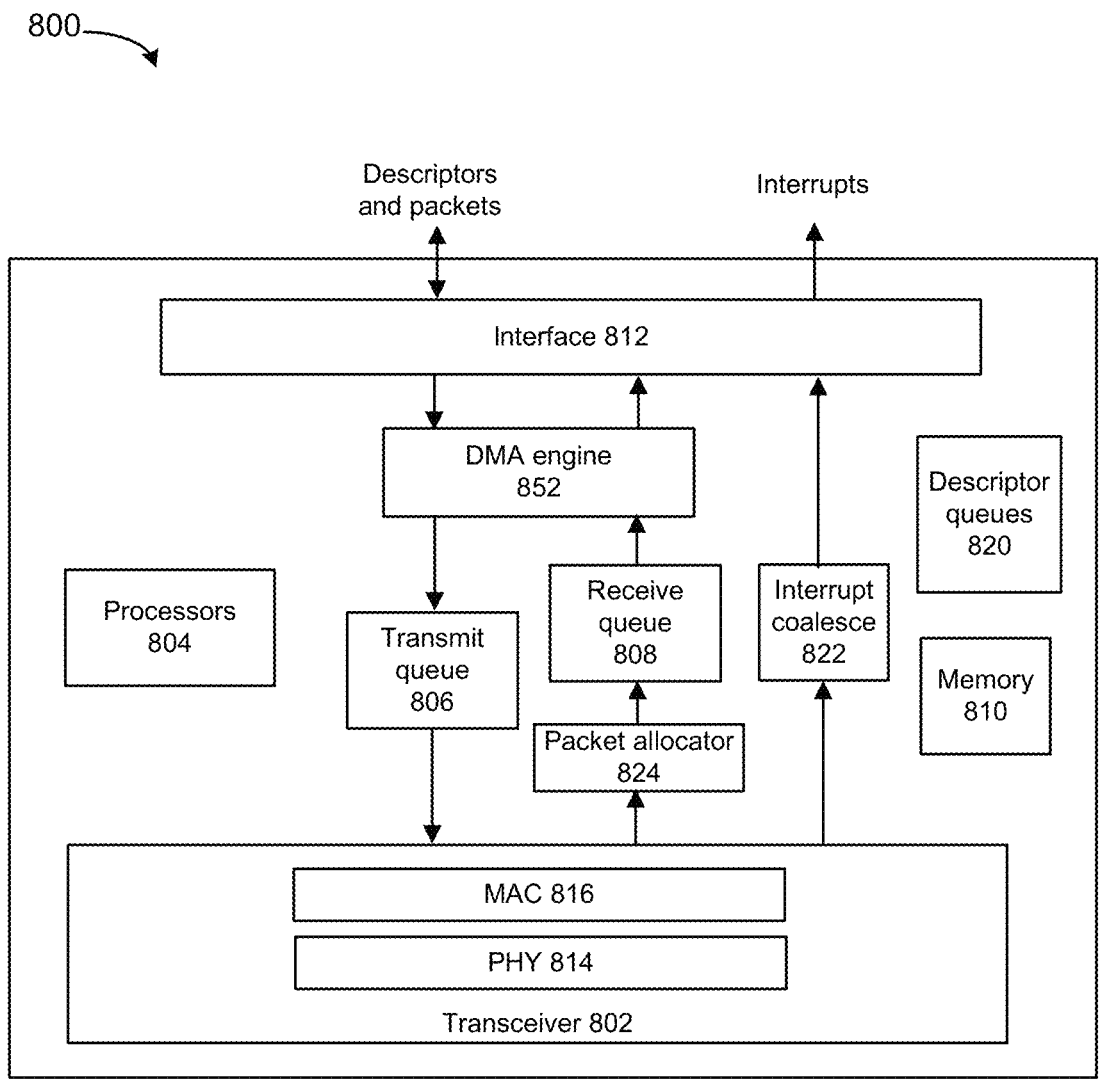
FIG. 8 depicts a network interface.

FIG. 8 depicts a network interface. Various embodiments can use the network interface or be used by the network interface. Network interface 800 can use transceiver 802, processors 804, transmit queue 806, receive queue 808, memory 810, and bus interface 812, and DMA engine 852. Transceiver 802 can be capable of receiving and transmitting packets in conformance with the applicable protocols such as Ethernet as described in IEEE 802.3, although other protocols may be used. Transceiver 802 can receive and transmit packets from and to a network via a network medium (not depicted). Transceiver 802 can include PHY circuitry 814 and media access control (MAC) circuitry 816. PHY circuitry 814 can include encoding and decoding circuitry (not shown) to encode and decode data packets according to applicable physical layer specifications or standards. MAC circuitry 816 can be configured to assemble data to be transmitted into packets, that include destination and source addresses along with network control information and error detection hash values. Processors 804 can be any a combination of a: processor, core, graphics processing unit (GPU), field programmable gate array (FPGA), application specific integrated circuit (ASIC), or other programmable hardware device that allow programming of network interface 800. For example, processors 804 can provide for identification of a resource to use to perform a workload and generation of a bitstream for execution on the selected resource. For example, a "smart network interface" can provide packet processing capabilities in the network interface using processors 804.

Packet allocator 824 can provide distribution of received packets for processing by multiple CPUs or cores using timeslot allocation described herein or RSS. When packet allocator 824 uses RSS, packet allocator 824 can calculate a hash or make another determination based on contents of a received packet to determine which CPU or core is to process a packet.

Interrupt coalesce 822 can perform interrupt moderation whereby network interface interrupt coalesce 822 waits for multiple packets to arrive, or for a time-out to expire, before generating an interrupt to host system to process received packet(s). Receive Segment Coalescing (RSC) can be performed by network interface 800 whereby portions of incoming packets are combined into segments of a packet. Network interface 800 provides this coalesced packet to an application.

Direct memory access (DMA) engine 852 can copy a packet header, packet payload, and/or descriptor directly from host memory to the network interface or vice versa, instead of copying the packet to an intermediate buffer at the host and then using another copy operation from the intermediate buffer to the destination buffer.

Memory 810 can be any type of volatile or non-volatile memory device and can store any queue or instructions used to program network interface 800. Transmit queue 806 can include data or references to data for transmission by network interface. Receive queue 808 can include data or references to data that was received by network interface from a network. Descriptor queues 820 can include descriptors that reference data or packets in transmit queue 806 or receive queue 808. Bus interface 812 can provide an interface with host device (not depicted). For example, bus interface 812 can be compatible with PCI, PCI Express, PCI-x, Serial ATA, and/or USB compatible interface (although other interconnection standards may be used).

Figure 9:
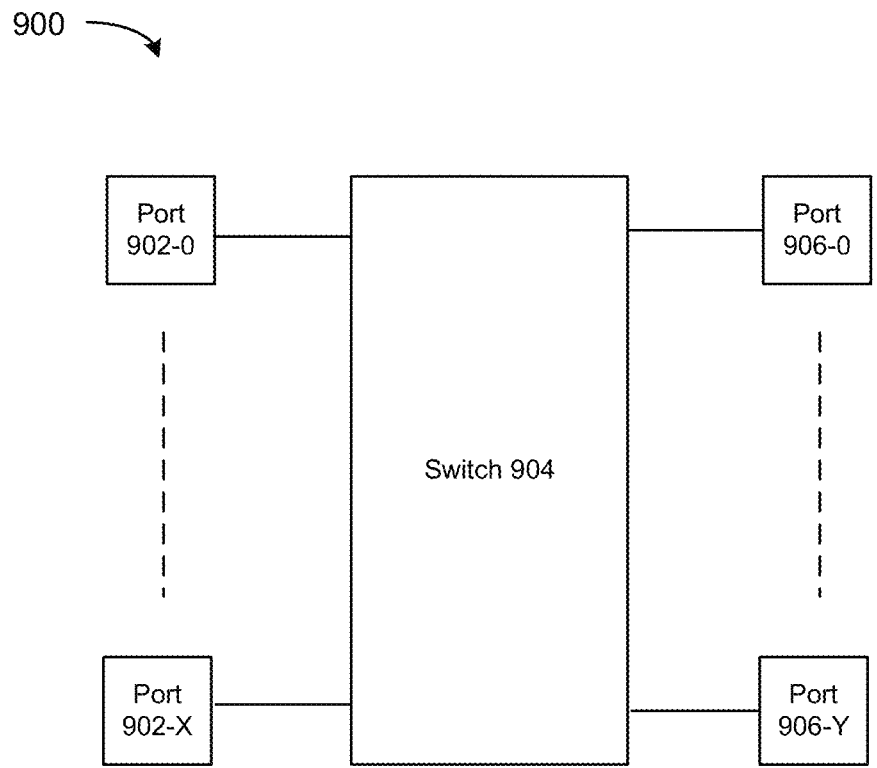
FIG. 9 depicts a switch.

FIG. 9 depicts a switch. Various embodiments can be used in or with the switch of FIG. 9 to adjust transmitter equalizer settings for any electrical or optical signal transmitter. Switch 904 can route packets or frames of any format or in accordance with any specification from any port 902-0 to 902-X to any of ports 906-0 to 906-Y (or vice versa). Any of ports 902-0 to 902-X can be connected to a network of one or more interconnected devices. Similarly, any of ports 906-0 to 906-X can be connected to a network of one or more interconnected devices. Switch 904 can decide which port to transfer packets or frames to using a table that maps packet characteristics with an associated output port. In addition, switch 904 can perform packet replication for forwarding of a packet or frame to multiple ports and queuing of packets or frames prior to transfer to an output port.

Figure 10:
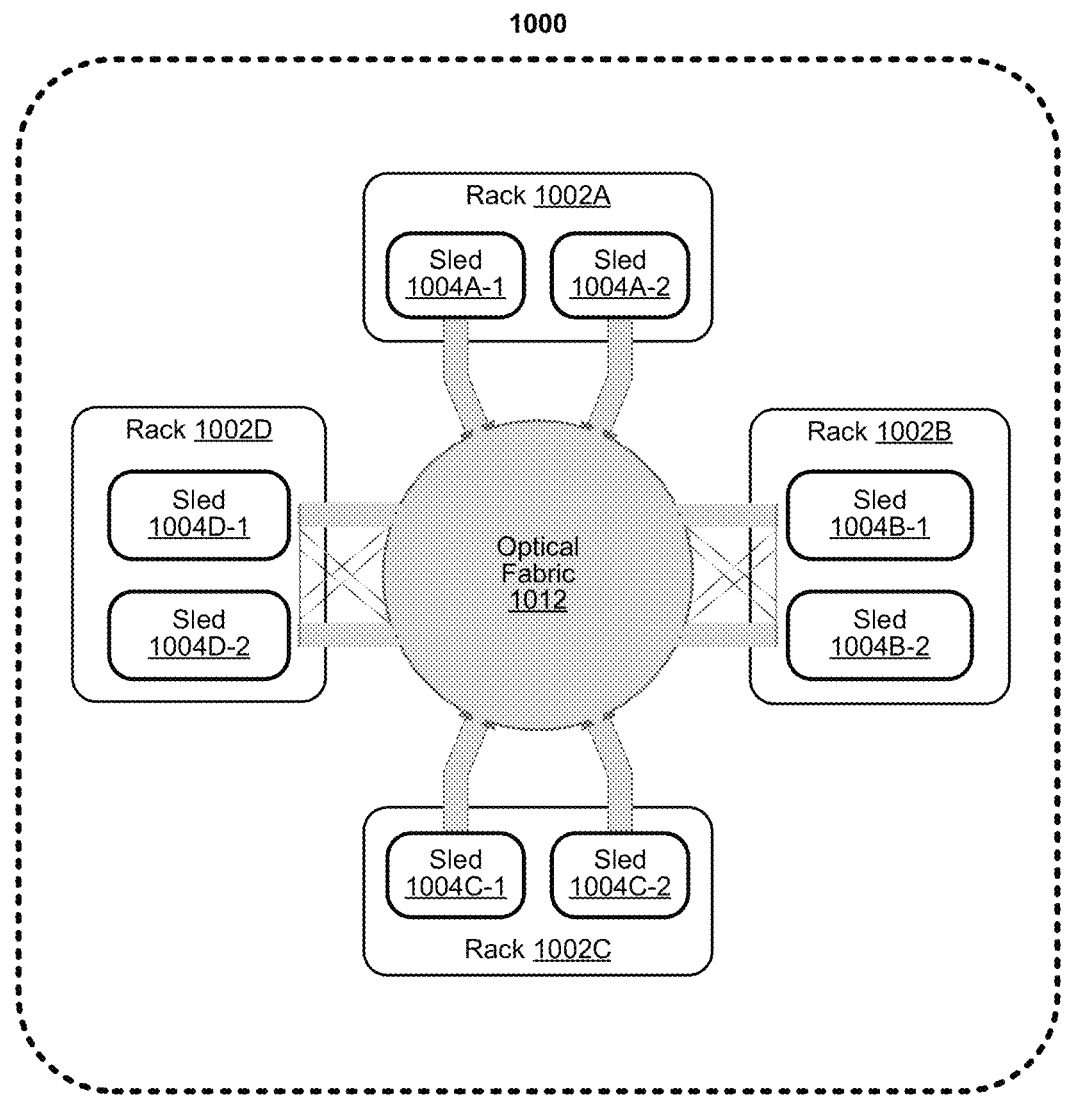
FIG. 10 depicts an example of a data center.

FIG. 10 depicts an example of a data center. Various embodiments can be used in or with the data center of FIG. 10 to adjust transmitter equalizer settings for any electrical or optical signal transmitter. As shown in FIG. 10, data center 1000 may include an optical fabric 1012. Optical fabric 1012 may generally include a combination of optical signaling media (such as optical cabling) and optical switching infrastructure via which any particular sled in data center 1000 can send signals to (and receive signals from) the other sleds in data center 1000. The signaling connectivity that optical fabric 1012 provides to any given sled may include connectivity both to other sleds in a same rack and sleds in other racks. Data center 1000 includes four racks 1002A to 1002D and racks 1002A to 1002D house respective pairs of sleds 1004A-1 and 1004A-2, 1004B-1 and 1004B-2, 1004C-1 and 1004C-2, and 1004D-1 and 1004D-2. Thus, in this example, data center 1000 includes a total of eight sleds. Optical fabric 10012 can provide sled signaling connectivity with one or more of the seven other sleds. For example, via optical fabric 10012, sled 1004A-1 in rack 1002A may possess signaling connectivity with sled 1004A-2 in rack 1002A, as well as the six other sleds 1004B-1, 1004B-2, 1004C-1, 1004C-2, 1004D-1, and 1004D-2 that are distributed among the other racks 1002B, 1002C, and 1002D of data center 1000. The embodiments are not limited to this example. For example, fabric 1012 can provide optical and/or electrical signaling.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, and so forth.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry."

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes a device-to-device connection apparatus comprising: a first device comprising a receiver for a lane of a communications link; a second device comprising a transmitter for the lane of the communications link; and a management entity, wherein: the receiver in the first device is to receive signals from the transmitter of the second device, the first device including a plurality of management registers, the second device including a plurality of management registers, and in response to detection of toggling of a request identifier bit, the management entity is to communicate equalization settings from the receiver to the transmitter by a copy of a management register of the first device to a management register of the second device in order to select an equalizer tap coefficient of the transmitter independent of modification of another tap coefficient.

Example 2 includes any example, wherein the management entity is to communicate equalization settings from the receiver to the transmitter during link operation.

Example 3 includes any example, wherein the management entity is to copy a management register of the first device to a management register of the second device independent of use of the lane and by use of a serial interface.

Example 4 includes any example, wherein the serial interface is compatible with one or more of: I2C, Management Data Input/Output (MDIO), SMBus, or Serial Peripheral Interface Bus (SPI).

Example 5 includes any example, wherein a set of four registers are defined for the lane to communicate equalizer settings and receive feedback on the use or non-use of the settings.

Example 6 includes any example, wherein the first device comprises an optical communications module.

Example 7 includes any example, wherein the first device comprises an electrical signal communications device.

Example 8 includes any example, wherein the management entity is to reconfigure equalization for the communications link after the communications link is established.

Example 9 includes any example, wherein: the first device comprises a transmitter for the lane of the communications link and the second device comprising a receiver for the lane of the communications link and the management entity is to communicate equalization settings to the transmitter of the first device by a copy of a management register of the second device to a management register of the first device in order to select an equalization coefficient for the transmitter of the first device.

Example 10 includes any example, wherein the communications link includes a plurality of lanes.

Example 11 includes any example, wherein a management register of the first device is to indicate selection of equalization coefficients to modify and indicate whether to increment or decrement the coefficients.

Example 12 includes any example and comprises: in response to detection of toggling a response identifier bit, the management entity is to communicate a response from the transmitter to the receiver by a copy of a second management register of the second device to a second management register of the first device, wherein the second management register of the second device is to identify coefficients indicated for modification or indicate use or non-use of equalization coefficients.

Example 13 includes a method comprising: receiving, by a receiver in a first device, signals over a lane from a transmitter in a second device, the first device including a plurality of management registers and the second device including a plurality of management registers; communicating, by a management entity, equalization settings from the first device to the second device by copying a management register of the first device to a management register of the second device; and selecting, by the management entity, an equalization coefficient for the transmitter of the lane from the second device to configure equalization settings of an equalizer tap coefficient independent of change of a coefficient of another tap.

Example 14 includes any example and comprises: communicating equalization settings from the first device to the second device during link operation and reconfiguring equalization for the communications link after the communications link is established.

Example 15 includes any example, wherein copying a management register of the first device to a management register of the second device by use of a management entity occurs by using a serial interface independent of use of the lane.

Example 16 includes any example, wherein the serial interface is compatible with one or more of: I2C, Management Data Input/Output (MDIO), SMBus, or Serial Peripheral Interface Bus (SPI).

Example 17 includes any example, wherein the management entity is to copy content of a first management register of the first device to a second management register of the second device in response to toggling of a request ID bit in the first management register of the first device.

Example 18 includes any example, wherein the first management register of the first device is to identify one or more taps and indicate whether to increment or decrement coefficient values for the one or more taps.

Example 19 includes any example and comprises: in response to detection of toggling a response identifier bit, communicating a response from the second device to the first device by copying content of a first management register of the second device to a first management register of the first device, wherein the first management register of the second device identifies coefficients indicated for modification or indicates use or non-use of equalization coefficients.

Example 20 includes a system comprising: a Media Access Control (MAC) module; a Reconciliation Sublayer (RS) module; and a Physical Layer (PHY) circuitry, including: a module receiver in a module to receive data over a communications link from a host transmitter, the module including a plurality of module management registers; and a plurality of host management registers accessible by a management entity, the management entity to communicate equalization settings between the module receiver and the host transmitter via the plurality of host management registers and the plurality of module management registers to select an equalization coefficient for the host transmitter to configure equalization for the communications link between the host transmitter and the module receiver.

Example 21 includes any example, wherein the module is an optical module.

Example 22 includes any example, wherein the management entity is to reconfigure equalization for the communications link after the communications link is established.

Example 23 includes any example and comprises a network interface, host computer, rack, blade, server, or data center.

What is claimed is:

1. An apparatus comprising:
   a receiver;
   a plurality of registers; and
   circuitry to, based on signals received at the receiver, request a setting change of a particular equalizer tap of a transmitter of the signals to be adjusted in part by a write to at least one management register, wherein:
   the signals comprise training data and
   the at least one management register is to indicate readiness of the receiver to receive data from the transmitter.

2. The apparatus of claim 1, wherein the request a setting change of a particular equalizer tap of a transmitter of the signals to be adjusted in part by a write to at least one management register comprises a write to the at least one management register to indicate selection of an equalizer tap setting to modify and indication of whether to increase or decrease the equalizer tap setting.

3. The apparatus of claim 1, wherein the request a setting change of a particular equalizer tap of a transmitter of the signals to be adjusted in part by a write to at least one management register comprises a write to the at least one management register to indicate selection of an equalizer tap setting to modify and indication of an amount to increase or decrease the equalizer tap setting.

4. The apparatus of claim 1, wherein:
   at least one management register is to indicate use or non-use of the requested setting change of the particular equalizer tap by the transmitter.

5. The apparatus of claim 1, wherein:
   at least one management register is to indicate use or non-use of the requested setting change of the particular equalizer tap of the transmitter and a particular lane for which the requested setting change of the particular equalizer tap of the transmitter was applied.

6. The apparatus of claim 1, comprising a network interface comprising the receiver and comprising a host computing system coupled to receive and process data from the receiver.

7. An apparatus comprising:
   a transmitter to transmit signals, wherein the signals comprise training data;
   a plurality of management registers; and circuitry, wherein:
   based on a management register of the plurality of management registers including a request to change a setting of a particular equalizer tap of the transmitter:
   the circuitry is to apply the request to change a setting of a particular equalizer tap and
   the circuitry is to provide in a second management register of the plurality of management registers, a response to the request to change a setting of a particular equalizer tap of the transmitter and
   based on a management register of a receiver indicating readiness of the receiver to receive data from the transmitter, the transmitter is to transmit data.

8. The apparatus of claim 7, wherein:
   the request to change a setting of a particular equalizer tap of the transmitter comprises selection of an equalizer tap setting to modify and indication of whether to increase or decrease the equalizer tap setting.

9. The apparatus of claim 7, wherein:
   the request to change a setting of a particular equalizer tap of the transmitter comprises selection of an equalizer tap setting to modify and indication of an amount to increase or decrease the equalizer tap setting.

10. The apparatus of claim 7,
    comprising circuitry is to determine at least one coefficient of at least one other equalizer tap based on an algebraic relationship between coefficients of equalizer taps.

11. A method comprising:
    receiving signals at a receiver, and
    based on the signals received at the receiver, requesting a setting change of a particular equalizer tap of a transmitter of the signals to be adjusted in part by a write to at least one management register, wherein:
    the signals comprise training data and
    the at least one management register is to indicate readiness of the receiver to receive data from the transmitter.

12. The method of claim 11, wherein the request a setting change of a particular equalizer tap of a transmitter of the signals to be adjusted in part by a write to at least one management register comprises a write to the at least one management register to indicate selection of an equalizer tap setting to modify and indication of whether to increase or decrease the equalizer tap setting.

13. The method of claim 11, wherein the request a setting change of a particular equalizer tap of a transmitter of the signals to be adjusted in part by a write to at least one management register comprises a write to the at least one management register to indicate selection of an equalizer tap setting to modify and indication of an amount to increase or decrease the equalizer tap setting.

14. The method of claim 11, wherein:
    at least one management register is to indicate use or non-use of the requested setting change of the particular equalizer tap by the transmitter.

15. A method comprising:
at a transmitter transmitting signals that comprises training data, based on at least one management register associated with the transmitter including a request to change a setting of a particular equalizer tap of the transmitter:
- applying the request to change a setting of a particular equalizer tap and
- providing a response in the at least one management register to the request to change a setting of a particular equalizer tap of the transmitter and based on a management register of a receiver indicating readiness of the receiver to receive data from the transmitter, transmitting data from the transmitter.

16. The method of claim 15, wherein:
the request to change a setting of a particular equalizer tap of the transmitter comprises selection of an equalizer tap setting to modify and indication of whether to increase or decrease the equalizer tap setting.

17. The method of claim 15, wherein:
the request to change a setting of a particular equalizer tap of the transmitter comprises selection of an equalizer tap setting to modify and indication of an amount to increase or decrease the equalizer tap setting.

18. The method of claim 16, comprising:
determining at least one coefficient of at least one other equalizer tap based on an algebraic relationship between coefficients of equalizer taps.

* * * * *